United States Patent
Shahi et al.

(10) Patent No.: US 9,515,538 B2
(45) Date of Patent: Dec. 6, 2016

(54) DYNAMOELECTRIC MACHINE ASSEMBLIES HAVING MEMORY FOR USE BY EXTERNAL DEVICES

(75) Inventors: Prakash B. Shahi, St. Louis, MO (US); Mark E. Carrier, Wildwood, MO (US); Christopher D. Schock, O'Fallon, MO (US)

(73) Assignee: Nidec Motor Corporation, St. Louis, MO (US)

( * ) Notice: Subject to any disclaimer, the term of this patent is extended or adjusted under 35 U.S.C. 154(b) by 928 days.

(21) Appl. No.: 12/156,097

(22) Filed: May 29, 2008

(65) Prior Publication Data

US 2009/0300270 A1 Dec. 3, 2009

(51) Int. Cl.
*G06F 12/00* (2006.01)
*F24F 7/007* (2006.01)

(52) U.S. Cl.
CPC ............ *H02K 11/35* (2016.01); *G06F 12/00* (2013.01)

(58) Field of Classification Search
CPC ..................................... G06F 12/00
USPC .................................. 711/173, 100
See application file for complete search history.

(56) References Cited

U.S. PATENT DOCUMENTS

| | | | |
|---|---|---|---|
| 5,809,279 A * | 9/1998 | Oeda et al. ................... | 711/153 |
| 6,330,806 B1 * | 12/2001 | Beaverson et al. ........... | 62/201 |
| 6,768,279 B1 * | 7/2004 | Skinner et al. .......... | 318/400.12 |
| 7,675,257 B2 | 3/2010 | Beifus et al. | |
| 7,826,929 B2 * | 11/2010 | Wacker ......................... | 700/276 |
| 2002/0052713 A1 * | 5/2002 | Abraham et al. ............. | 702/183 |
| 2003/0040842 A1 * | 2/2003 | Poth .............................. | 700/275 |
| 2003/0052180 A1 * | 3/2003 | Huhn et al. ................... | 236/49.3 |
| 2003/0052182 A1 * | 3/2003 | Rajaram ........................... | 238/2 |
| 2004/0220777 A1 * | 11/2004 | St. Jean et al. ............... | 702/185 |
| 2006/0009863 A1 * | 1/2006 | Lingemann ..................... | 700/19 |
| 2008/0048045 A1 * | 2/2008 | Butler et al. ................ | 236/74 R |
| 2008/0059833 A1 * | 3/2008 | Harrod ............................... | 714/4 |
| 2008/0109662 A1 * | 5/2008 | Natarajan et al. ............ | 713/193 |
| 2008/0276065 A1 * | 11/2008 | Jeong .................. | G06F 12/0246 |
| | | | 711/173 |
| 2009/0140064 A1 * | 6/2009 | Schultz et al. .................. | 236/51 |

* cited by examiner

*Primary Examiner* — Yaima Rigol
*Assistant Examiner* — Gautam Sain
(74) *Attorney, Agent, or Firm* — Hovey Williams LLP

(57) ABSTRACT

A method is provided for storing data from an external device in a dynamoelectric machine assembly (i.e., an electric motor or generator). The dynamoelectric machine assembly includes a memory device and a processor for controlling operation of the dynamoelectric machine assembly in response to commands from an external device. The method includes receiving a command from the external device to store data in the memory device of the dynamoelectric machine assembly, and storing the data in the memory device in response to the command. Dynamoelectric machine assemblies, external devices and systems suitable for use in the provided method are also disclosed.

9 Claims, 5 Drawing Sheets

DYNAMOELECTRIC MACHINE ASSEMBLIES HAVING MEMORY FOR USE BY EXTERNAL DEVICES

FIELD

The present disclosure relates to dynamoelectric machine assemblies having memory for use by external devices, and external devices configured for storing data in and reading data from such memory.

BACKGROUND

The statements in this section merely provide background information related to the present disclosure and may not constitute prior art.

Electric motor assemblies commonly include a motor having a shaft for driving rotation of a component coupled to the shaft, and a motor controller for controlling operation of the motor. The motor controller typically includes one or more memory devices, sometimes including both volatile and nonvolatile memory devices. The motor controller uses these memory devices to store and retrieve software and data as necessary for controlling operation of the motor.

As recognized by the present inventors, and as further explained below, it would be advantageous for an electric motor assembly to permit external devices, such as programming tools and/or system controllers that communicate with the electric motor assembly, to store data in and read data from the memory devices within the electric motor (or generator) assembly.

SUMMARY

According to one aspect of the present disclosure, a method is disclosed for storing data from an external device in a dynamoelectric machine assembly (i.e., an electric motor or generator assembly). The dynamoelectric machine assembly includes a memory device and a processor for controlling operation of the dynamoelectric machine assembly in response to commands from an external device. The method includes receiving a command from the external device to store data in the memory device of the dynamoelectric machine assembly, and storing the data in the memory device in response to said command.

According to another aspect of the present disclosure, a dynamoelectric machine assembly includes a stator, a rotor and a memory device. At least a portion of the memory device is configured to be written to and read by an external device to permit the external device to store data in and retrieve data from the portion of the memory device.

According to yet another aspect of the present disclosure, a controller is disclosed for a system that includes a dynamoelectric machine assembly. The dynamoelectric machine assembly includes a motor and a motor controller having at least one memory device. The controller includes a processor for running software, memory for storing software and a communication interface for communicating with the dynamoelectric machine assembly. The controller is configured to transmit to the dynamoelectric machine assembly, via the communication interface, data and commands to write data to the memory device in the dynamoelectric machine assembly.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

According to one aspect of the present disclosure, a method is disclosed for storing data from an external device in an electric motor assembly. The electric motor assembly includes a memory device and a processor for controlling operation of the electric motor assembly in response to commands from an external device. The method includes receiving a command from the external device to store data in the memory device of the electric motor assembly, and storing the data in the memory device in response to said command. In this manner, the memory device in the electric motor can be advantageously used by one or more external devices for storing and retrieving data.

The method may further include receiving a command from an external device to read data from the memory device in the electric motor, retrieving stored data from the memory device in response to the command, and providing the retrieved data to the external device. This read command may be received from the same external device that previously stored the data in the memory device of the electric motor, or from one or more other external devices.

The external device(s) may be any device capable of communicating with the electric motor assembly (e.g., through a wired or wireless interface) as necessary to store data in and retrieve data from the memory device in the electric motor assembly. As further described below, the external device may be a controller for a system that includes the electric motor assembly. For example, the external device may be a heating, ventilating and/or air conditioning (HVAC) system controller, and the electric motor assembly may be coupled to a blower (also called an air handler) in the HVAC system. The external device may also be a thermostat, or a computerized tool, such as a handheld programming or diagnostic tool, for use with the electric motor assembly.

In some implementations of the method described above, multiple external devices may write to and retrieve data from the same memory device in the electric motor assembly. For example, an HVAC system controller and a handheld programming tool may each store data in the memory device of an electric motor assembly coupled to a blower. Further, the handheld programming tool may retrieve data from the memory device that was stored by the HVAC system controller (or another external device), and vice versa.

A few embodiments of electric motor assemblies, system controllers and systems for carrying out the method disclosed above will now be described with reference to FIGS. 1-5. It should be understood, however, that a wide variety of other assemblies, controllers and systems can be employed in carrying out the disclosed method without departing from the scope of this disclosure.

Figure 1:
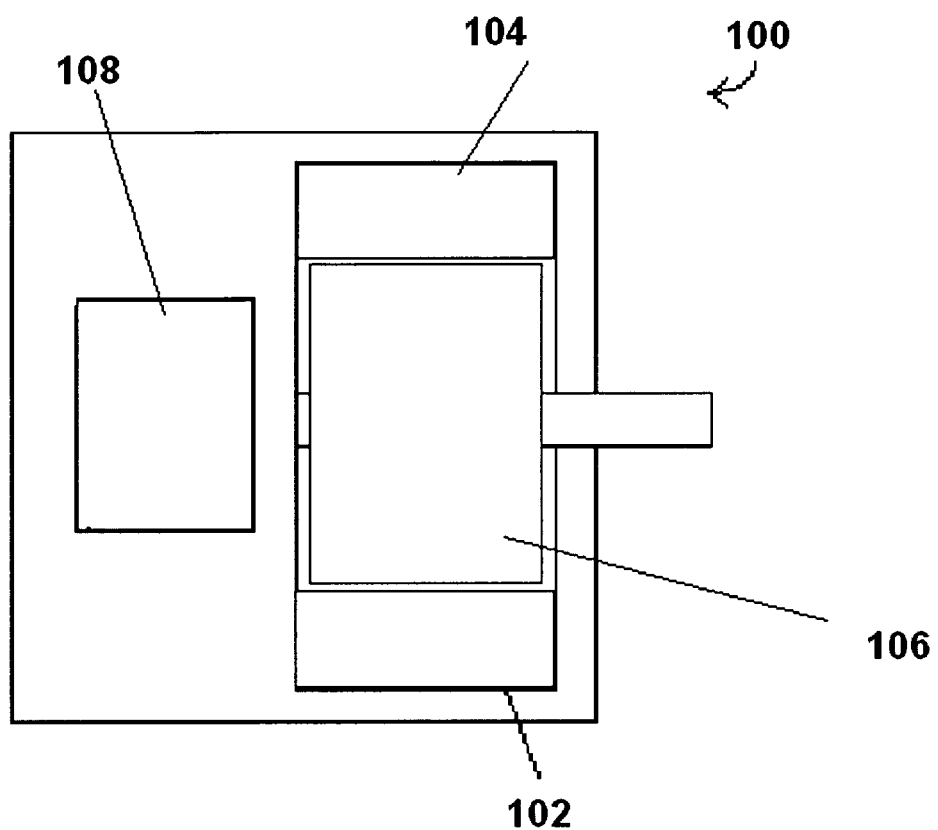
FIG. 1 is a block diagram of an electric motor assembly having memory for use by an external device according to one embodiment of the present disclosure.

One example embodiment of an electric motor assembly is illustrated in FIG. 1 and indicated generally by reference numeral 100. As shown in FIG. 1, the electric motor assembly 100 includes an electric motor 102 having a stator 104, a rotor 106, and a memory device 108. At least a portion of the memory device 108 is configured to be written to and read by an external device (not shown in FIG. 1) to permit the external device to store data in and retrieve data from the memory device 108. In this manner, one or more external devices can use at least a portion of the memory device 108 as, e.g., a scratchpad for temporary or permanent storage, and subsequent retrieval, of calculations and/or other data.

The memory device 108 may be non-volatile memory so that data is not lost when power is removed from the memory device 108. Alternatively, the memory device 108 may be volatile memory.

The motor 102 may be any suitable type of motor including brushless permanent magnet (BPM), switched reluctance (SR), permanent split capacitor (PSC), capacitor start, synchronous, induction, single phase, and three phase motors, to name a few. In most cases, the type of motor 102 employed will depend on the intended use of the electric motor assembly 100.

Figure 2:
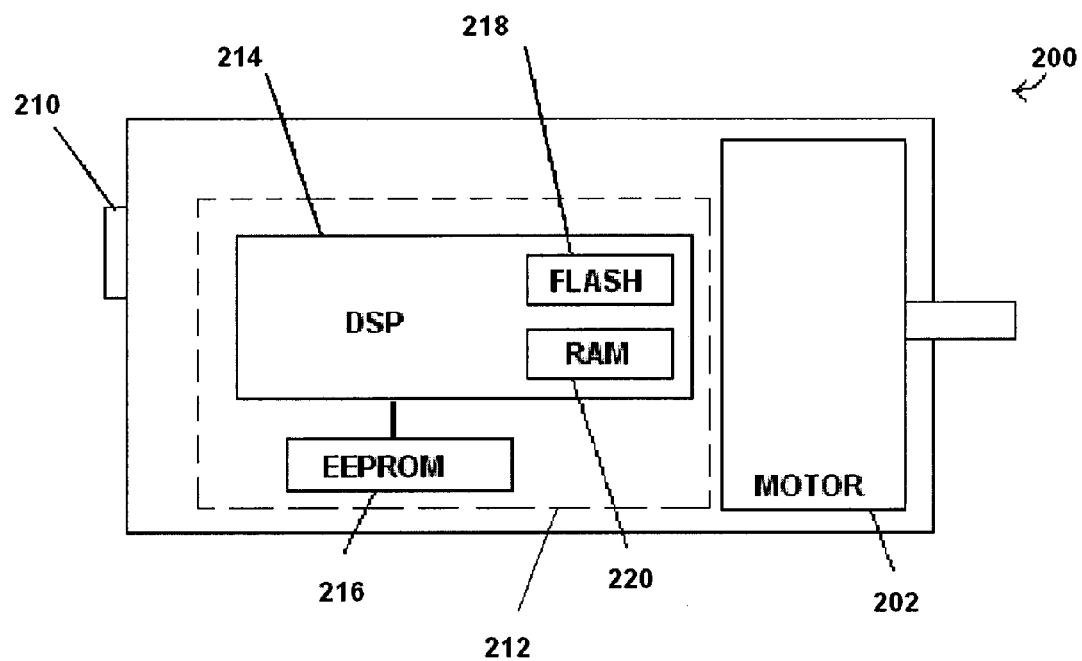
FIG. 2 is a block diagram of an electric motor assembly having memory for use by an external device according to another embodiment of this disclosure.

FIG. 2 illustrates an electric motor assembly 200 according to another embodiment of the present disclosure. Similar to the assembly 100 of FIG. 1, the assembly 200 of FIG. 2 includes an electric motor 202 having a stator and a rotor (not shown in FIG. 2). The assembly 200 of FIG. 2 further includes a communication interface 210 for communicating with one or more external devices, and a motor controller 212 for controlling operation of the electric motor 202. In some implementations, the motor controller 212 will control operation of the electric motor 202 in response to commands received through the communication interface 210 from an external device.

The communication interface 210 may be any suitable interface that permits communication between the assembly 200 and one or more external devices, including both wired and wireless interfaces. As just one example, the communication interface 210 may include one or more electrical connectors for electrically coupling the assembly 200 to one or more external devices (one at a time or simultaneously) via electrical cabling. Further, the assembly 200 can be configured to communicate with the external device(s) using any suitable communication protocol, including both open and closed (i.e., proprietary) protocols.

In the specific embodiment of FIG. 2, the motor controller 212 includes a digital signal processor (DSP) 214 and an electrically erasable programmable read-only memory (EEPROM) 216. The DSP 214 includes a flash memory 218 and a random access memory (RAM) 220. The RAM 220 is volatile memory, while the flash memory 218 and the EEPROM 216 are nonvolatile memory devices. Thus, data stored in the flash memory 218 and/or the EEPROM 216 is not lost when power is removed from these devices, while data stored in the RAM 220 will be lost when power is removed from the DSP 214. The DSP 214 can write data to and read data from the RAM 220, the EEPROM 216 and the flash memory 218.

Additionally, the electric motor assembly 200 of FIG. 2 is configured to permit an external device to write data to and read data from at least a portion of the EEPROM 216. Therefore, at least a portion of the EEPROM 216 is allocated for use by an external device(s), and is not used by the motor controller 212 for controlling operation of the motor 202. The amount of memory in the EEPROM 216 that is allocated for use by an external device(s) will typically depend on the anticipated data storage needs of the external device(s). This allocated portion of the EEPROM 216 may be partitioned to function as though it were a physically separate memory unit, or may be dedicated for use by one or more external devices in another suitable manner.

As an alternative, or in addition to storing data in the EEPROM 216, the electric motor assembly 200 can be configured to permit external devices to write data to and read data from the flash memory 218, the RAM 220 and/or any other memory device in the motor assembly 200.

Although the motor assembly 200 of FIG. 2 is illustrated with a single housing containing both the motor 202 and the motor controller 212, it should be understood that a variety of other configurations can be employed. For example, the motor controller 212 can be contained in a separate housing that mounts directly to the motor housing; the motor 202 and the motor controller 212 can be contained in physically separate housings that are connected by one or more electric cables, etc.

Figure 3:
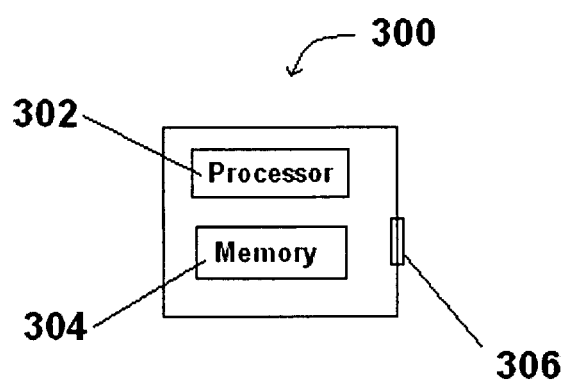
FIG. 3 is a block diagram of a controller for a system that includes an electric motor assembly according to another embodiment of this disclosure.

FIG. 3 illustrates one embodiment of a system controller 300 for a system that includes an electric motor assembly having a motor and a motor controller that includes at least one memory device, such as, e.g., the electric motor assembly 200 of FIG. 2. As shown in the FIG. 3, the system controller 300 includes a processor 302 for executing software, a memory device 304 for storing data and/or software, and a communication interface 306 for communicating with the electric motor assembly. Similar to the communication interface 210 shown in FIG. 2, the communication interface 306 shown in FIG. 3 may be any suitable wired or wireless interface. The system controller 300 is configured to transmit data and commands to the electric motor assembly, via the communication interface 306, to write data to and/or read data from the memory device (e.g., the RAM 220, the flash memory 218, and/or the EEPROM 216) in the motor controller (e.g., the motor controller 212).

The system controller 300 illustrated generally in FIG. 3 can be configured for a wide variety of systems that include one or more electric motor assemblies including, for example, HVAC systems. When configured as an HVAC system controller, the system controller 300 may include numerous sensors, such as flame sensors, temperature sensors, etc., and numerous input/output (I/O) ports (not shown in FIG. 3) for communicating with other controllers, assemblies, components, etc. in the HVAC system.

Figure 4:
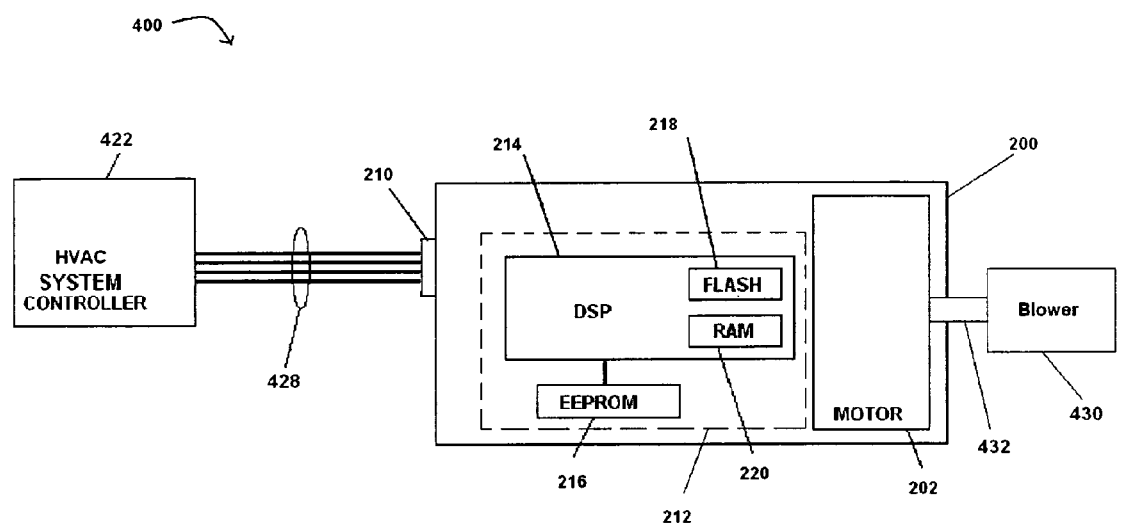
FIG. 4 is a block diagram of an HVAC system according to another embodiment of this disclosure.

FIG. 4 illustrates an HVAC system 400 according to another embodiment of the present disclosure. As shown in FIG. 4, the system 400 includes an electric motor assembly 200 communicatively coupled to an HVAC system controller 422. The electric motor assembly 200 includes an electric motor 202 having a shaft 432 coupled to a blower 430 for moving air in the HVAC system 400. The electric motor assembly 200 is configured to permit the HVAC system controller 422 to write data to and read data from at least one memory device in the electric motor assembly.

In the particular embodiment shown in FIG. 4, the electric motor assembly 200 is coupled for communication with the HVAC system controller 422 via a communication cable 428. Alternatively, the electric motor assembly 200 can be coupled for communication with the HVAC system controller 422 via other means, including wirelessly.

During operation, the HVAC system controller 422 sends commands and data to the electric motor assembly 200 via the communication cable 428. These commands and data may include, for example, turn on and turn off commands, ramp rates, and operating parameters (e.g., operating mode, direction of rotation, blower coefficients, speed set points, torque set points or CFM set points, etc.). In response, the motor controller 212 energizes the motor 202 as necessary to produce, for example, a demanded torque, speed, or airflow.

The HVAC system controller 422 and the electric motor assembly 200 may communicate with one another using any suitable protocol including, for example, the ClimateTalk™ protocol available from the White-Rodgers division of Emerson Electric Co. and the ECM communication protocol developed by General Electric Company.

Additionally, the HVAC system controller 422 and the electric motor assembly 200 are configured to permit the HVAC system controller 422 to write data to and read data from a portion of the EEPROM 216. Alternatively, or additionally, the motor assembly 200 can be configured to permit the HVAC system controller 422 to write to and read from the flash memory 218 and/or the RAM 220. In one exemplary embodiment, one or more portions of the EEPROM 216, the flash memory 218 and/or the RAM 220 are suitably allocated for use by the HVAC system controller 422 (and/or another external device), and are not used by the motor controller 212 for controlling operation of the motor 202. For example, the HVAC system controller 422 may transmit a "store" or "write" command along with data to be stored. In response, the motor assembly 200 stores the transmitted data in the allocated portion of memory for subsequent access by the HVAC system controller 422 (or another external device). The stored data may include, for example, fault data, checksum data, data specific to the original equipment manufacturer (OEM) of the HVAC system controller 422, the electric motor assembly 200, or the HVAC system 400, data concerning the HVAC system controller 422 and the number of start commands sent to the motor assembly 200, etc. Further, the stored data may include data used exclusively by the overall system OEM and may have no meaning or significance to the motor assembly 200. For example, the system OEM may store certain data in the motor assembly 200 relating to the HVAC system (including parts or portions thereof). The stored data may be read from time to time for monitoring purposes, for adaptively improving control of the HVAC system, etc. Additionally, or alternatively, the stored data may include, for similar purposes, data stored by OEMs of individual components in the HVAC system 400.

If, for example, the system controller 422 has previously stored in the EEPROM 216 data representing the number of start commands sent to the assembly 200, the system controller 422 may update that data upon issuing a new start command. Thus, the system controller 422 may read from the EEPROM 216 (by sending an appropriate "read" command to the electric motor assembly 200) the number of previously sent start commands, increment that number by one, and store in the EEPROM 216 the updated number of sent start commands. As apparent to those skilled in the art, a wide variety of other data can be stored in and subsequently read from the EEPROM 216 (and/or the flash memory 218 and/or RAM 220) by the HVAC system controller 422.

Figure 5:
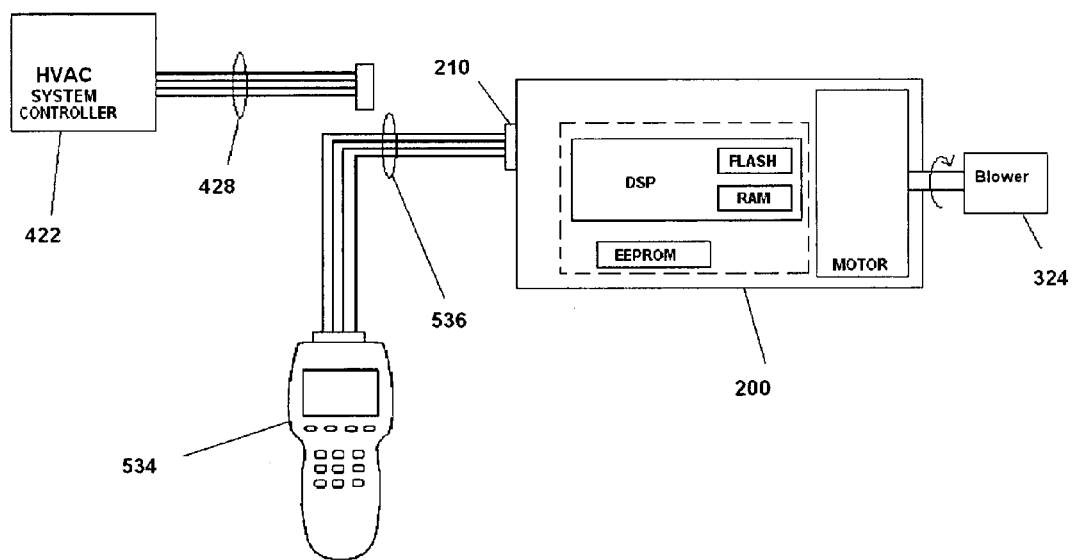
FIG. 5 is a block diagram of the HVAC system of FIG. 4 with a handheld computer device connected to the electric motor assembly.

As noted above, the electric motor assembly 200 can be configured to permit more than one external device to write data to and read data from a memory device within the motor assembly 200. For example, and as illustrated in FIG. 5, a handheld computer device 534 (such as a programming or diagnostic device) can be connected to the electric motor assembly 200 in place of the HVAC system controller 422 for system configuration, troubleshooting or other purposes. Further, the handheld computer device 534 can be configured to write data to and/or read data from the EEPROM or other memory devices in the electric motor assembly 200. The handheld computer device 534 can be permitted to read data stored in the EEPROM by the HVAC system controller 422 (or another external device). Conversely, the HVAC system controller 422 can be permitted to read data stored in the EERPOM by the handheld computer device 534 (or another external device).

In the embodiment of FIG. 5, only one external device (i.e., the HVAC system controller 422 or the handheld computer device 534) is connected to the electric motor assembly 200 at any given time. Alternatively, the electric motor assembly 200 can be configured to permit both the HVAC system controller 422 and the handheld computer device 534 (and possibly other external devices as well) to be connected to the assembly 200 (e.g., through cabling or wirelessly) at the same time.

In the case where multiple external devices are permitted to store data in memory within the electric motor assembly 200, each external device may have a unique portion of memory allocated to it so that one external device cannot overwrite data stored in the electric motor assembly 200 by another external device. Alternatively, the same portion of memory can be allocated for use by multiple external devices, if desired. Similarly, each external device can be permitted to read only data it previously stored in the electric motor assembly 200 or, alternatively, to read data previously stored by another external device (or independently stored by the motor controller and not in response to a "write" command from an external device).

Although the teachings of the present disclosure have been explained above relative to electric motor assemblies, which convert electrical energy into mechanical energy, it should be understood that these teachings are applicable to any dynamoelectric machine assembly, including generator assemblies that convert mechanical energy into electrical energy.

When introducing elements or features and specific embodiments, the articles "a," "an," "the" and "said" are intended to mean that there are one or more of such elements or features. The terms "comprising," "including" and "having" are intended to be inclusive and mean that there may be additional elements or features other than those specifically noted. Further, and unless stated otherwise, the processes and operations described herein are not to be construed as necessarily requiring their performance in the particular order discussed or illustrated, and may be performed with additional steps or operations other than those specifically noted.

While various features and embodiments have been described above, those skilled in the art will recognize that various changes and modifications may be made without departing from the scope of this disclosure. Accordingly, it is intended that this disclosure be limited only by the scope of the claims presented below, and their equivalents.

What is claimed is:

1. A heating, ventilating, or air conditioning (HVAC) system comprising:
   a blower motor assembly comprising a housing, an electric motor, a motor controller, and a memory device positioned within the housing for permitting a plurality of external devices to store non-transient data in and retrieve data from the memory device and positioned in the housing, the memory device being partitioned into at least a first portion, a second portion, and a third portion, wherein the first portion of the memory device is operable to be written to and read from only by the motor controller for operating the electric motor;
   an HVAC system controller for controlling the blower motor assembly and operable to write data to and read data from only the second portion of the memory in the blower motor assembly; and
   a handheld computer device for performing HVAC system configuration and troubleshooting and operable to read data from the second portion and to write data to and read data from the third portion of the memory in the blower motor assembly.

2. An electric motor apparatus comprising:
   a housing and an electric motor;
   a motor controller for controlling the operation of the electric motor; and
   a memory device positioned within the housing, the memory device including:
      a first portion allocated to be written to and read from only by the motor controller for operating the electric motor,
      a second portion allocated to be written to by only a heating, ventilating, or air conditioning (HVAC) system controller that is positioned outside the housing for storing data related to the operation of the HVAC system controller, the second portion operable to be read from by the HVAC system controller as well as other external devices, and
      a third portion allocated to be written to and read from by only a handheld computer device that is positioned outside the housing for performing HVAC system configuration and troubleshooting.

3. The electric motor apparatus of claim 2, wherein the data related to the operation of the HVAC system controller includes fault data and checksum data.

4. The electric motor apparatus of claim 2 further comprising a communication interface, wherein said second and third portions of the memory device are configured to be written to and read by external devices via the communication interface.

5. The electric motor apparatus of claim 4, wherein the communication interface includes an electrical connector.

6. The electric motor apparatus of claim 2 wherein the memory device is nonvolatile memory.

7. The electric motor apparatus of claim 6 wherein the nonvolatile memory device is an electrically erasable programmable read-only memory (EEPROM).

8. The electric motor apparatus of claim 2, further comprising an air handler for an HVAC system.

9. A method of maintaining data in a heating, ventilating, or air conditioning (HVAC) system electric motor assembly, the HVAC system electric motor assembly comprising a housing, a motor, a motor controller, and a memory device positioned within the housing, the method comprising the steps of:
   receiving data from the motor controller to be written to only a first portion of the memory device;
   sending data to the motor controller read from only the first portion of the memory device;
   receiving data from an HVAC system controller to be written to only a second portion of the memory device;
   sending data to the HVAC system controller read from only the second portion of the memory device;
   receiving data from a handheld computer device to be written to only a third portion of the memory device; and
   sending data to the handheld computer device read from the second portion or the third portion of the memory device.

* * * * *